US010956390B2

(12) United States Patent
Dunne et al.

(10) Patent No.: US 10,956,390 B2
(45) Date of Patent: Mar. 23, 2021

(54) INTERACTIVE VISUALIZATION

(71) Applicant: International Business Machines Corporation, Armonk, NY (US)

(72) Inventors: Cody G. Dunne, Cambridge, MA (US); T. Alan Keahey, Naperville, IL (US); Mauro Martino, Cambridge, MA (US); Deok Gun Park, Crofton, MD (US)

(73) Assignee: International Business Machines Corporation, Armonk, NY (US)

( * ) Notice: Subject to any disclaimer, the term of this patent is extended or adjusted under 35 U.S.C. 154(b) by 124 days.

(21) Appl. No.: 16/414,849

(22) Filed: May 17, 2019

(65) Prior Publication Data

US 2019/0272262 A1 Sep. 5, 2019

Related U.S. Application Data

(63) Continuation of application No. 15/274,434, filed on Sep. 23, 2016, now Pat. No. 10,331,636.

(51) Int. Cl.
*G06F 16/21* (2019.01)
*G06F 16/248* (2019.01)
*G06F 16/26* (2019.01)

(52) U.S. Cl.
CPC .......... *G06F 16/219* (2019.01); *G06F 16/211* (2019.01); *G06F 16/213* (2019.01); *G06F 16/248* (2019.01); *G06F 16/26* (2019.01)

(58) Field of Classification Search
CPC ..... G06F 16/211; G06F 16/213; G06F 16/219
See application file for complete search history.

(56) References Cited

U.S. PATENT DOCUMENTS

| 5,999,192 | A | 12/1999 | Selfridge et al. | |
|---|---|---|---|---|
| 8,743,122 | B2 | 6/2014 | Riche et al. | |
| 9,069,872 | B2 | 6/2015 | Adar et al. | |
| 9,335,911 | B1 | 5/2016 | Elliot et al. | |
| 2006/0122977 | A1* | 6/2006 | Brodhun | G06F 16/288 |
| 2008/0178117 | A1* | 7/2008 | Gelman | G06F 3/0481 715/808 |
| 2010/0205238 | A1 | 8/2010 | Cao et al. | |
| 2011/0078101 | A1 | 3/2011 | Gotz et al. | |

(Continued)

OTHER PUBLICATIONS

Anonymous, A Fine-Grained Method to Track Line Level Change History in Version Control Systems, Electronic Publication, Aug. 8, 2011, pp. 1-9, IPCOM000209489D.

(Continued)

*Primary Examiner* — William Spieler
(74) *Attorney, Agent, or Firm* — Lieberman & Brandsdorfer, LLC

(57) ABSTRACT

Embodiments relate to a system, product, and method for visually presenting data based on a viewing and change history. A first exploration is created, including a first and second view of a first data version. A second exploration is created, including a third and fourth view of a second data version. A first combined view of the first and second views is created containing a first data visualization of the first data version. A second combined view of the third and fourth views is created containing a second data visualization of the second data version. The first and second combined views are compared to display the structural changes between the first and second data versions.

15 Claims, 13 Drawing Sheets

(56) References Cited

U.S. PATENT DOCUMENTS

| | | |
|---|---|---|
| 2011/0078160 A1 | 3/2011 | Gotz et al. |
| 2012/0016849 A1 | 1/2012 | Garrod et al. |
| 2013/0055137 A1 | 2/2013 | Choc et al. |
| 2013/0204904 A1 | 8/2013 | Raffo et al. |
| 2014/0279865 A1 | 9/2014 | Kumar |
| 2016/0048351 A1 | 2/2016 | Kanteti et al. |

OTHER PUBLICATIONS

IBM, Method for Tracking User Session History Data Generation, IP.com Prior Art Database Technical Disclosure, Electronic Publication, Apr. 10, 2007, pp. 1-5, IPCOM000149851D.

Dunne et al., GraphTrail: Analyzing Large Multivariate, Heterogeneous Networks while Supporting Exploration History, CHI 2012, May 5-10, 2012, Austin TX, USA, pp. 1-10.

http://www.vistrails.org/index.php/Publications_Tutorials_and_Presentations.

Gulla, A Browser for a Versioned Entity-Relationship Database, Norwegian Institute of Technology (NTH), Presented at the Int'l Workshop on Interfaces to Database Systems (IDS'92), Glasgow, Scotland, Jul. 1-3, 1992, pp. 1-13.

Ogasawara et al., Comparison and Versioning of Scientific Workflows, May 17, 2009, Proceedings of the 2009 ICSE Workshop on Comparison and Versioning of Software Models, pp. 25-30.

List of IBM Patents or Applications Treated as Related, May 2019.

\* cited by examiner

US 10,956,390 B2

INTERACTIVE VISUALIZATION

CROSS REFERENCE TO RELATED APPLICATION(S)

This application is a continuation patent application claiming the benefit of the filing date of U.S. patent application Ser. No. 15/274,434 filed on Sep. 23, 2016 and titled "Interactive Visualization", now pending, the entire contents of which are hereby incorporated by reference.

BACKGROUND

The present invention relates to visually encoding data and analyzing an associated dataset. More specifically, the invention relates to encoding a dynamic dataset and supporting data exploration of the dynamic dataset.

Datasets can be represented in the form of a graph, as a collection of nodes connected together by edges. The graph may be in different forms, such as multi-modal, multi-relational, and/or multivariate. The graph is considered multi-modal when it includes multiple types of nodes. Similarly, the graph may be considered multi-relational when the nodes in the graph can be connected together using different types of edges, and the graph may be considered multivariate when each node and/or each edge is characterized by multiple attributes.

A visual rendition of the graph may be presented to visually depict an understanding of general patterns, trends, and features in the graph data. For example, the graph data may be presented as a collection of points, representing the nodes, connected by lines, representing the edges. This rendition may be effective for relatively small and/or static datasets, but becomes confusing and complex for larger datasets, as well as dynamic datasets.

SUMMARY

A system, computer program product, and method are provided to visually communicate structural and comparative access differences of data sets, and underlying data. In one aspect, a computer system is provided with a processing unit in communication with a memory, and a functional unit in communication with the processing unit. The functional unit has tools to present data based on a viewing and change history. The tools include, but are not limited to, a history index and a manipulator. The history index creates a first exploration, including first and second panels representing a first and second view of a first data version. The history index further creates a second exploration, including a second and third panel representing a third and fourth view of a second data version. The manipulator creates a first combined view of the first and second panels containing a first data visualization of the first data version. The manipulator creates a second combined view of the third and fourth panels containing a second data visualization of the second data version. The manipulator compares the first and second combined views to display the structural changes between the first and second data versions.

In another aspect, a computer program product is provided to present data based on a viewing and change history. The computer program product includes a computer readable storage device with embodied program code that is configured to create a first exploration, including first and second panels representing a first and second view of a first data version. The program code is provided to further create a second exploration, including a third and fourth panel representing a third and fourth view of a second data version. A first combined view of the first and second panels is created containing a first data visualization of the first data version. A second combined view of the third and fourth panels is created containing a second data visualization of the second data version. Program code compares the first and second combined views to display the structural changes between the first and second data versions.

In yet another aspect, a method is provided for presenting data based on a viewing and change history. A first exploration is created, including a first and second panel representing a first and second view of a first data version. A second exploration is also created, including a third and fourth panel representing a third and fourth view of a second data version. A first combined view of the first and second panels is created containing a first data visualization of the first data version. A second combined view of the third and fourth panels is created containing a second data visualization of the second data version. The first and second combined views are compared to display the structural changes between the first and second data versions.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments, and not of all embodiments unless otherwise explicitly indicated.

DETAILED DESCRIPTION

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

Dynamic is a technical term that refers to something that is capable of action or change. Static is a technical term that refers to something that is fixed. With respect to data and associated data values, it is understood that data is dynamic and is subject to change over time. Data analysis is a process of modeling or transforming data to discover useful information. With respect to data analysis, data exploration pertains to a search to form an analysis from an associated dataset and data characteristics. As data is explored, data visualization employs a visual context, such as a graphic visualization, to understand the data. At the same time, as the underlying data associated with the exploration and visualization changes, those changes are automatically reflected in the visualization and any associated data analysis.

Figure 1:
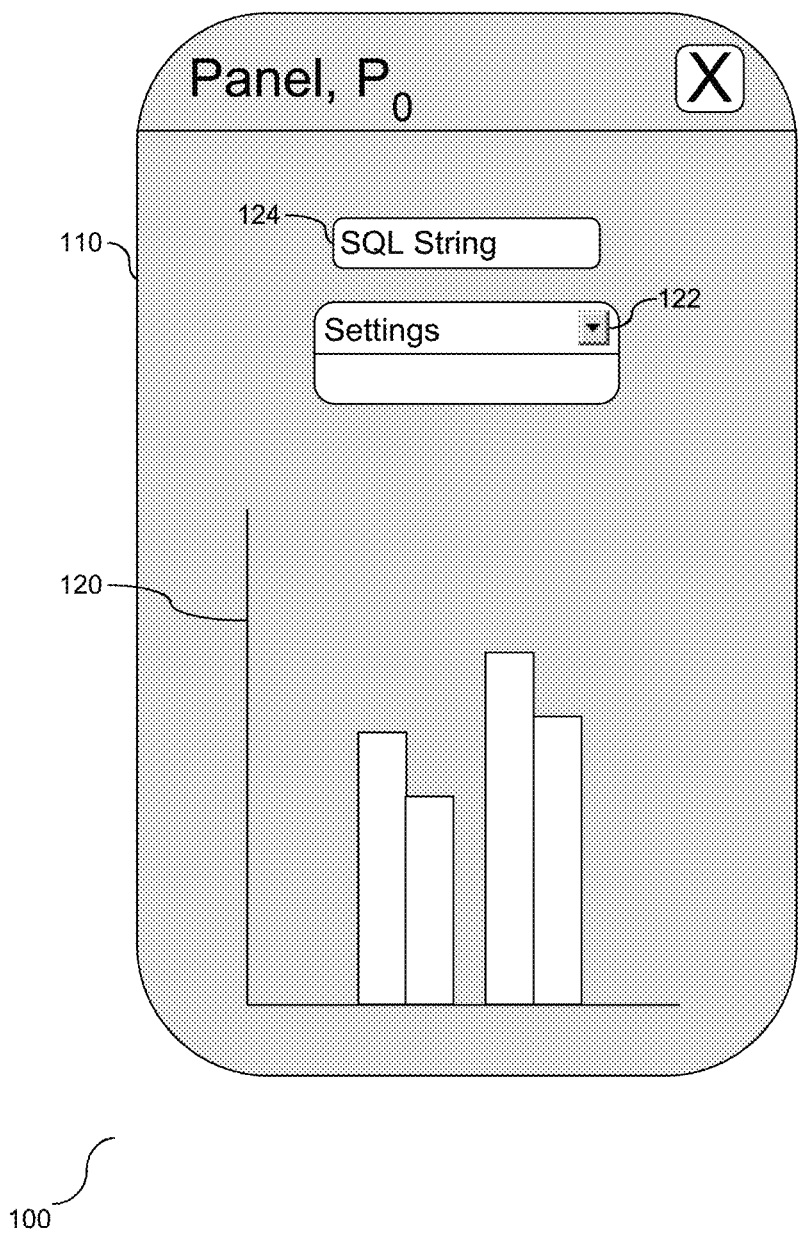
FIG. 1 depicts a block diagram illustrating a graphic data exploration providing a visual representation of a dataset.

Referring to FIG. 1, a block diagram (100) is provided illustrating a graphic data exploration providing a visual representation of a dataset. As shown, a data exploration is represented in a visualization (110), hereinafter called a view. The view functions as a mechanism to present a visual representation of a subset of data while supporting interaction with the visual representation. In one embodiment, the view (110) is a user interface presented on a visual display device. As shown herein, the example view (110) may be subdivided into sections, with one section presenting a data visualization in the form of a graph (120). Other sections shown herein include a setting interface button (122), a storage interface window (124) to select or identify a location of the underlying data, video, notes, and/or comments. The sections shown and described on the view (110) are examples, and as such should not be considered limiting. In one embodiment, the quantity of sections may vary, or similarly, the arrangement or categories of sections may vary. Accordingly, the view (110) functions as an interface that supports exploration of a subset of data.

Figure 2:
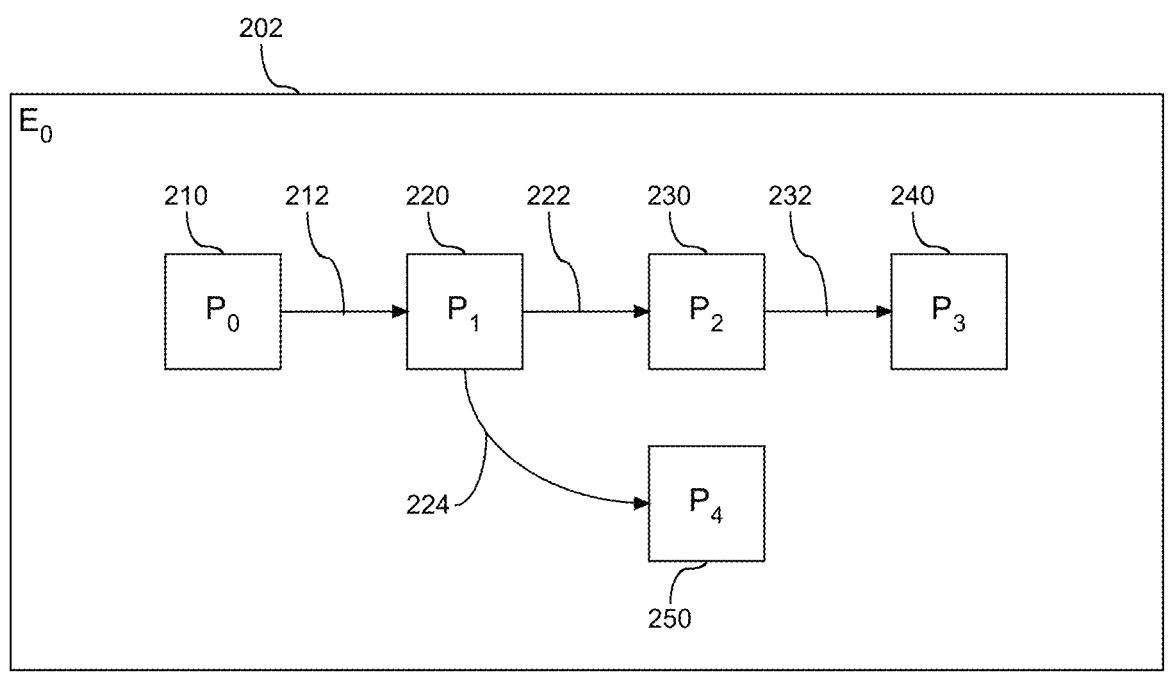
FIG. 2 depicts a block diagram illustrating an exploration and an associated trail.

Multiple views may be created through a series of successive data explorations. After each view is created it is saved as a panel in an exploration history. An exploration history is also referred to as an exploration. Referring to FIG. 2, a block diagram (200) is provided illustrating an exploration and its associated history trail. As shown in this example, there are five panels (210), (220), (230), (240), and (250) shown in an exploration (202). In one embodiment, the quantity of explorations may vary, and as such, the quantity shown herein should not be considered limiting. During the data exploration process, the history trail represents a visual perspective of the exploration path used to explore a dataset(s). The history trail is shown with links that connect the panels. As shown in this example, the history trail starts at panel (210) and proceeds to panel (220), as represented by link (212). The history trail then bifurcates as shown at links (222) and (224). Link (222) represents one direction of the history trail extending to panel (230), which then extends to panel (240), as represented by link (232). Another direction of the history trail is shown at link (224) which extends from panel (220) to panel (250). The links (212), (222), (224), and (232) leave a history trail representing a path and associated actions. Each link connects a source panel to a target panel indicating that the target panel was produced in part or in whole from the source panel. The organization of panels shown in FIG. 2 forms a graph, such as a directed acyclic graph (DAG). In one embodiment, the panels represent nodes in the graph, and the links represent edges. Accordingly, the history trail provides a graphic visualization of the exploration history.

Figure 3:
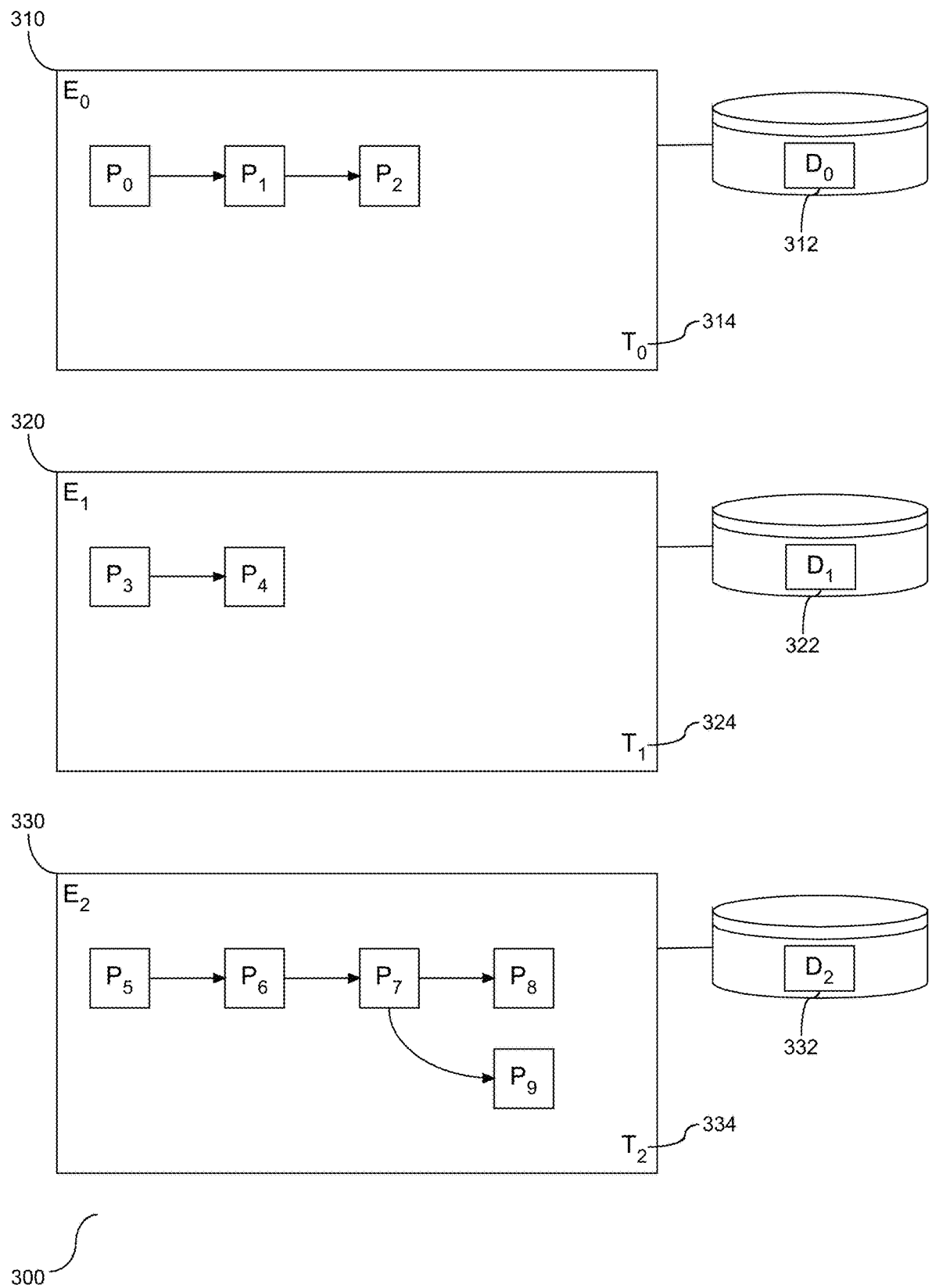
FIG. 3 depicts a block diagram illustrating multiple data explorations.

A history trail may be limited to a single entity interfacing with a dataset. However, it is understood that data may be shared by multiple entities and each entity may conduct separate data explorations, with each data exploration having an associated history trail. In one embodiment, the history trail can be shared by multiple data explorations. Referring to FIG. 3, a block diagram (300) is provided illustrating multiple data explorations. In this example, three explorations are shown $E_0$ (310), $E_1$ (320), and $E_2$ (330). The explorations may be by the same entity or by a different entity. Similarly, the explorations may take place at the same time or a different time. In this example, each exploration is associated with a different entity and a dataset at the time of the exploration. More specifically, exploration$_0$ ($E_0$) (310) is shown to employ data or a first database, $D_0$ (312) at a point-in-time, $T_0$ (314). Similarly, in support $E_1$ (320) is shown to employ data or a second database, $D_1$ (322) at a point-in-time, $T_1$ (324), and $E_2$ (330) is shown to employ data or a third database, $D_2$ (332) at a point-in-time, $T_2$ (334). As time progresses, data may be subject to change. Although each exploration may access the same data or database, data at time $T_0$ (314) may be different than data at time $T_1$ (324), which may be different than data at time $T_2$ (334). Accordingly, each data exploration represents a history trail, as shown in FIG. 2, with the data exploration investigating the data at a point-in-time.

Figure 4:
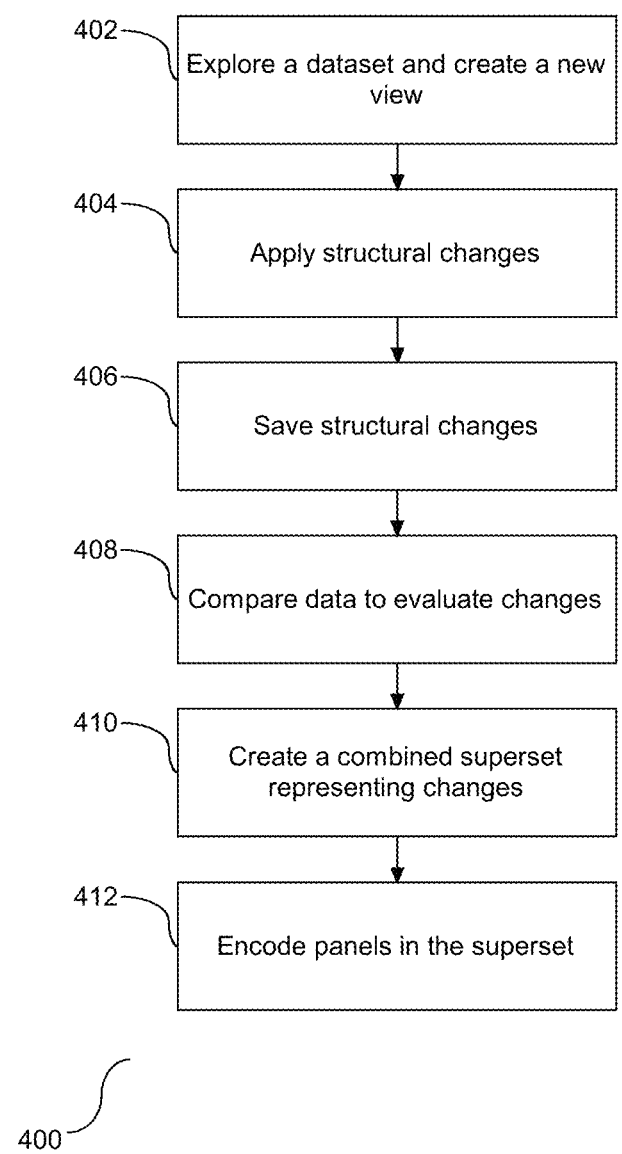
FIG. 4 depicts a flow chart for illustrating a process for visually conveying data changes to one or more data explorations or panels within the one or more explorations.

As shown in FIG. 3, data is subject to change over the course of time. Referring to FIG. 4, a flow chart (400) is provided illustrating a process for visually conveying data changes to one or more data explorations or panels within the one or more explorations. A new view $V_0$, is created and a corresponding panel, $P_0$, is created in an exploration, $E_0$, to explore dataset $D_0$ (402). Structural changes to the exploration history are supported and applied (404). The structural changes include, but are not limited to, applying a filter operation, combining filtering operations with an existing panel in the exploration, changing a visual representation of data within a panel, or pivoting to a panel within the exploration. The structural changes are saved in a new panel, $P_1$, in exploration $E_0$, or in one embodiment in a new exploration $E_1$, as panel $P_1$ (406). Based on the views being saved as different panels, and in one embodiment at different points-in-time, comparison of the corresponding panels is supported. Accordingly, the structural changes conveyed in the new panels may include, but are not limited to structural and comparative access difference, which may also include changes to data over time.

Data represented in different panels and/or different exploration may be compared to evaluate changes in the represented data (408). A combined superset of panels, $P_2$, is created (410), with $P_2$ representing changes from $P_0$ and $P_1$. Panels that are a part of the superset are encoded (412), with the encoding aligning with any data changes. For example, the encoding may include visual indicators within the superset with indicia to identify panels that are new, panels that have exited the exploration, and panels that have a change in the underlying structure to the data. More specifically, the indicia identify structural changes and structural differences that are detected in response to the comparison. In one embodiment, the communication of structural changes and structural differences is automatic whenever a comparison of panels or explorations takes place. Examples of such indicia identifying the changes include, but are not limited to, border patterns and fill, object fill and patterns and iconography. Accordingly, the comparison yields a visually encoded superset of panels that reflect the dynamic characteristic of the data by tracking or otherwise identifying changes to data.

Figure 5A:
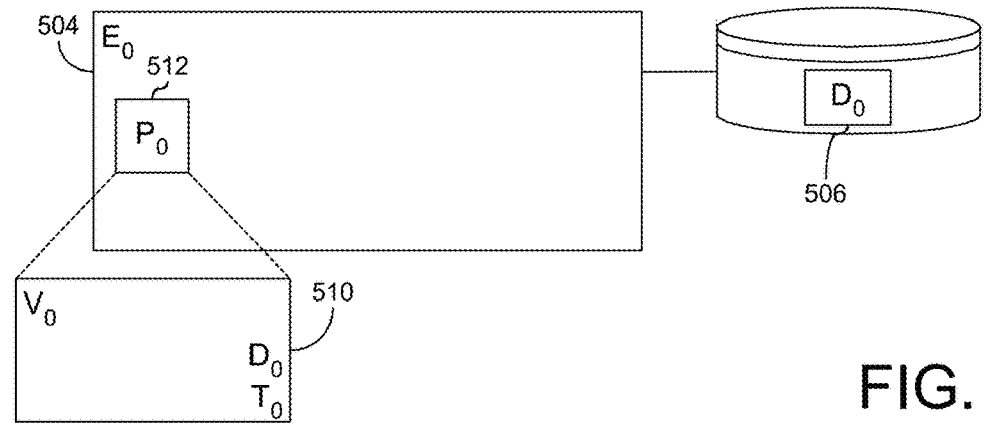
FIGS. 5A-5D depicts a process for creating one or more data explorations histories for visually conveying data changes to one or more data explorations or panels within the one or more explorations.
Figure 5B:
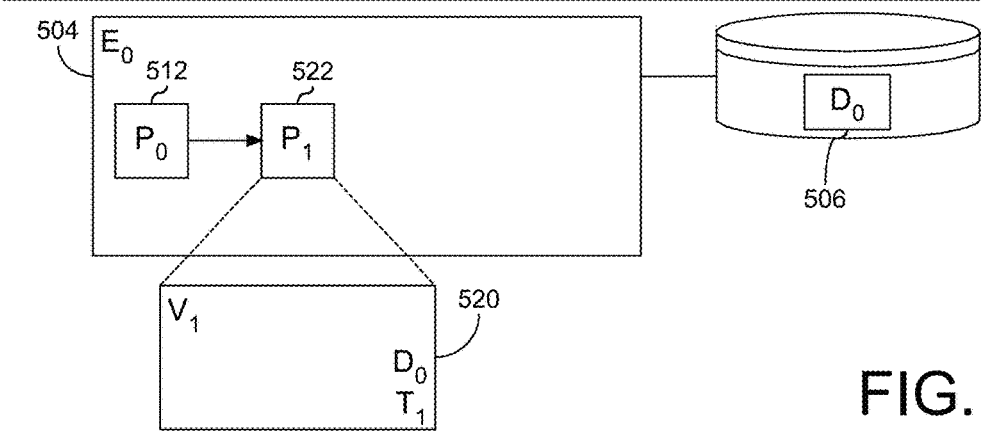

Referring to FIG. 5A, an example is shown for the creation of an exploration history. A first view, $V_0$ (510), is created to explore dataset $D_0$ (506) and a corresponding panel, $P_0$ (512), is created in an exploration, $E_0$ (504). Referring to FIG. 5B, second view, $V_1$ (520), is created with structural changes to the exploration history applied and a corresponding panel, $P_1$ (522), is created in the exploration $E_0$ (504), or in one embodiment in a new exploration $E_1$, as view $V_1$. Based on the views being saved as different panels, and in one embodiment at different points-in-time, comparison of the views is supported. Accordingly, the structural changes conveyed in the new panels may include, but are not limited to structural and comparative access difference, which may also include changes to data over time.

Figure 5C:
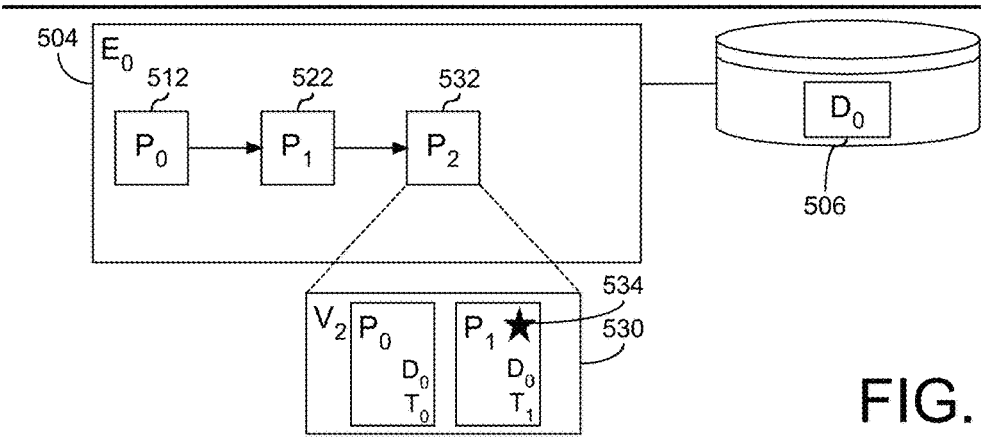

Referring to FIG. 5C, a data comparison view, $V_2$ (530) is created to evaluate changes in the represented data (e.g. comparison of $P_0$ (512) and $P_1$ (522)). A combined superset of panels, $P_2$ (532), is created with $P_2$ representing changes from $P_0$ (512) and $P_1$ (522). Panels that are a part of the superset are encoded, with the encoding aligning with any data changes. For example, the encoding may include visual indicators (534) within the superset with indicia to identify panels that are new, panels that have exited the exploration, and panels that have a change in the underlying structure to the data. More specifically, the indicia identify structural changes and structural differences that are detected in response to the comparison. In one embodiment, the communication of structural changes and structural differences is automatic whenever a comparison of panels or explorations takes place. Examples of such indicia identifying the changes include, but are not limited to, borders, object fill or pattern, and iconography. Accordingly, the comparison yields a visually encoded superset of panels that reflect the dynamic characteristic of the data by tracking or otherwise identifying changes to data.

Figure 5D:
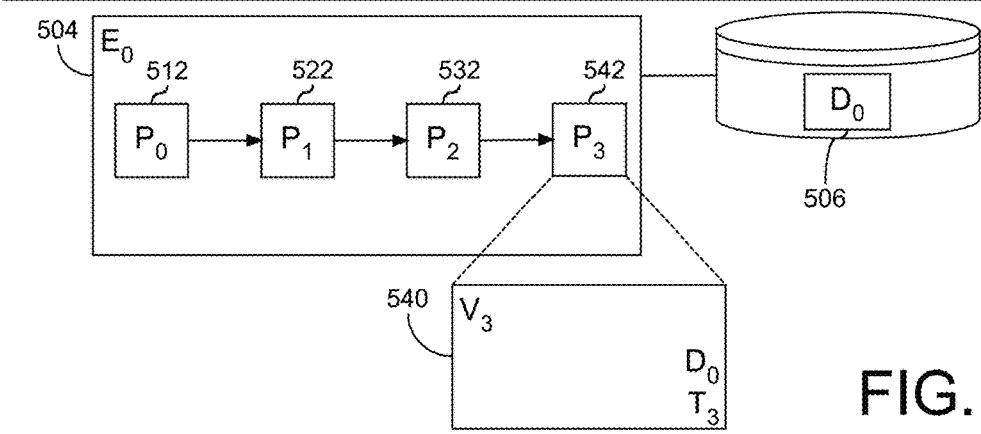

Referring to FIG. 5D, a fourth view, $V_3$ (540), is created with structural changes to the exploration history applied and a corresponding panel, $P_3$ (542), is created in the exploration $E_0$ (504), or in one embodiment in a new exploration $E_2$, as view $V_3$. Based on the views being saved as different panels, and in one embodiment at different points-in-time, comparison of the views is supported. Accordingly, the structural changes conveyed in the new panels may include, but are not limited to structural and comparative access difference, which may also include changes to data over time. In one embodiment, different explorations are created for each view. In one embodiment, a database $D_1$ is used to create the fourth view $V_3$ (540). In one embodiment, a fifth view, $V_4$, comprises the entire exploration history contained in $E_0$ (504). In one embodiment, a sixth view, $V_5$, comprises the exploration histories contained in both $E_0$ and $E_1$. The amount of panels or explorations created should not be considered limiting. Accordingly, the panels and explorations record an exploration history of a set or sets of data that can be accessed for further analysis.

Figure 6:
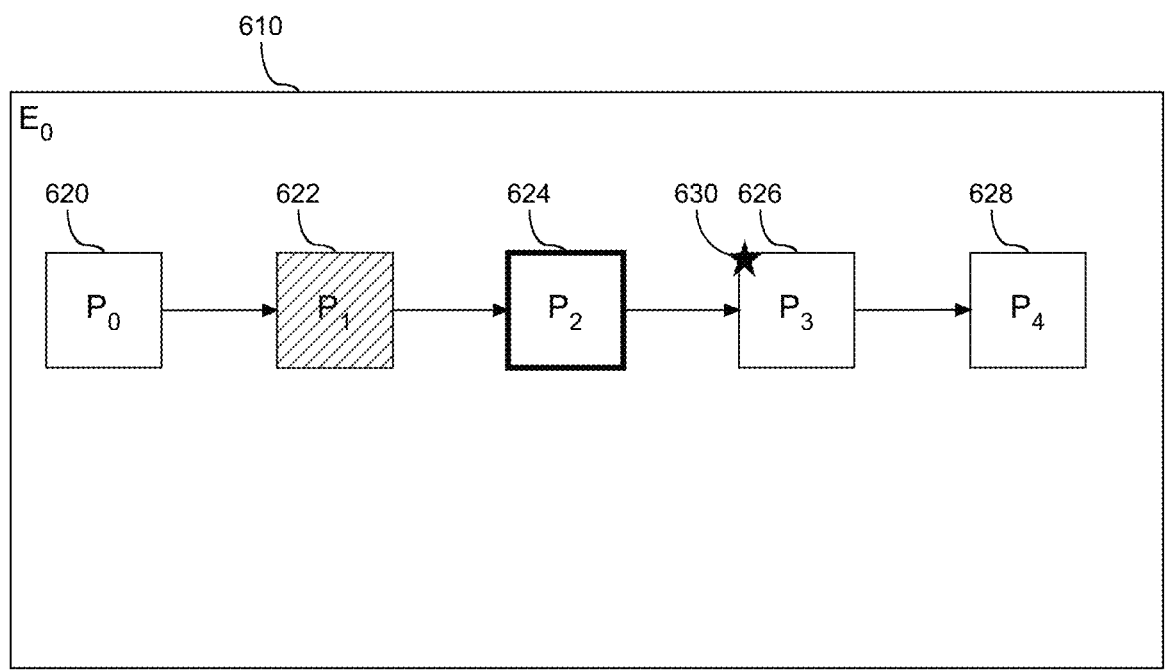
FIG. 6 depicts an exploration containing a combined superset of panels.

Referring to FIG. 6, an example exploration history (600) is provided illustrating a combined superset of panels in an exploration. As shown, an exploration, $E_0$ (610), is provided with a plurality of panels $P_0$ (620), $P_1$ (622), $P_2$ (624), $P_3$ (626), and $P_4$ (628). Each panel is encoded to reflect structural changes. The exploration (610) is a comparison created to convey a combined superset of panels from two different datasets. For example, the superset of panels in the exploration (610) may result in a panel entering the subset, a panel exiting the subset, a changed structure to one or more of the panels, etc. In one embodiment, "entering" refers to when a selection is made to select a number of elements for a new representation of data. In one embodiment, "exiting" refers to the reverse of entering. (i.e. returning to the original selection of data). In one embodiment, "structural changes" refer to modifying the representation of the data.

A visual indicator is applied to each of the panels in the exploration, with the indicator conveying the status of the panel. In this example, a pattern is applied to panel (622) to demonstrate that this panel has entered the subset, a different pattern in the form of a border fill is applied along the perimeter of panel (624) to demonstrate that this panel has exited the subset, and an icon (630) is applied to panel (626) to demonstrate that a change to the structure of the panel is present in the subset. Panels (620) and (628) do not have a pattern, border fill or icon applied to them, thereby demonstrating that these panels remain unchanged in the subset. In a further embodiment, a pattern, border fill or icon can be applied to a panel that remains unchanged in the subset. The indicia and indicators applied to the panels in the illustrated subset should not be considered a limiting example. In one embodiment, additional or alternative indicia and indicators may be utilized to provide a visual representation or indication of structural differences and/or changes to the data in the subset. Accordingly, the subset and associated encoding communicates the status of the panels in the subset thereby visually providing insight into the dynamic characteristics of the represented data.

With respect to the combined superset created in FIG. 4, a viewer can create a combined superset. In one embodiment, the view is the data that is selected to be observed on a visual display and can be a data subset, the entire dataset, a portion of a panel or a whole panel, a set of panels, a portion of an exploration, a whole exploration, or a plurality of explorations. These examples are for illustration and should not be considered limiting. In addition, or as an alternative to the combination, the viewer can select to return to a prior view (e.g. the view's corresponding panel), $P_0$, or prior exploration, $E_0$. Each panel represents an analysis of data taken at a point-in-time, and each panel is saved in data storage. When a different view is selected, such as when the current view, $V_0$, contains $E_2$ and the selected view, $V_1$, contains $E_1$, the returned display may include a combined superset of panels that are a part of $E_1$ and $E_2$ or the returned display may be limited to the panels of $E_1$. With respect to the combined superset at step (410), the combination stems from a comparison of a set of data in $E_1$ at a first point-in-time with a second set of data in $E_2$ at a second point-in time. Accordingly, flexibility of dataset comparisons is supported.

Figure 7:
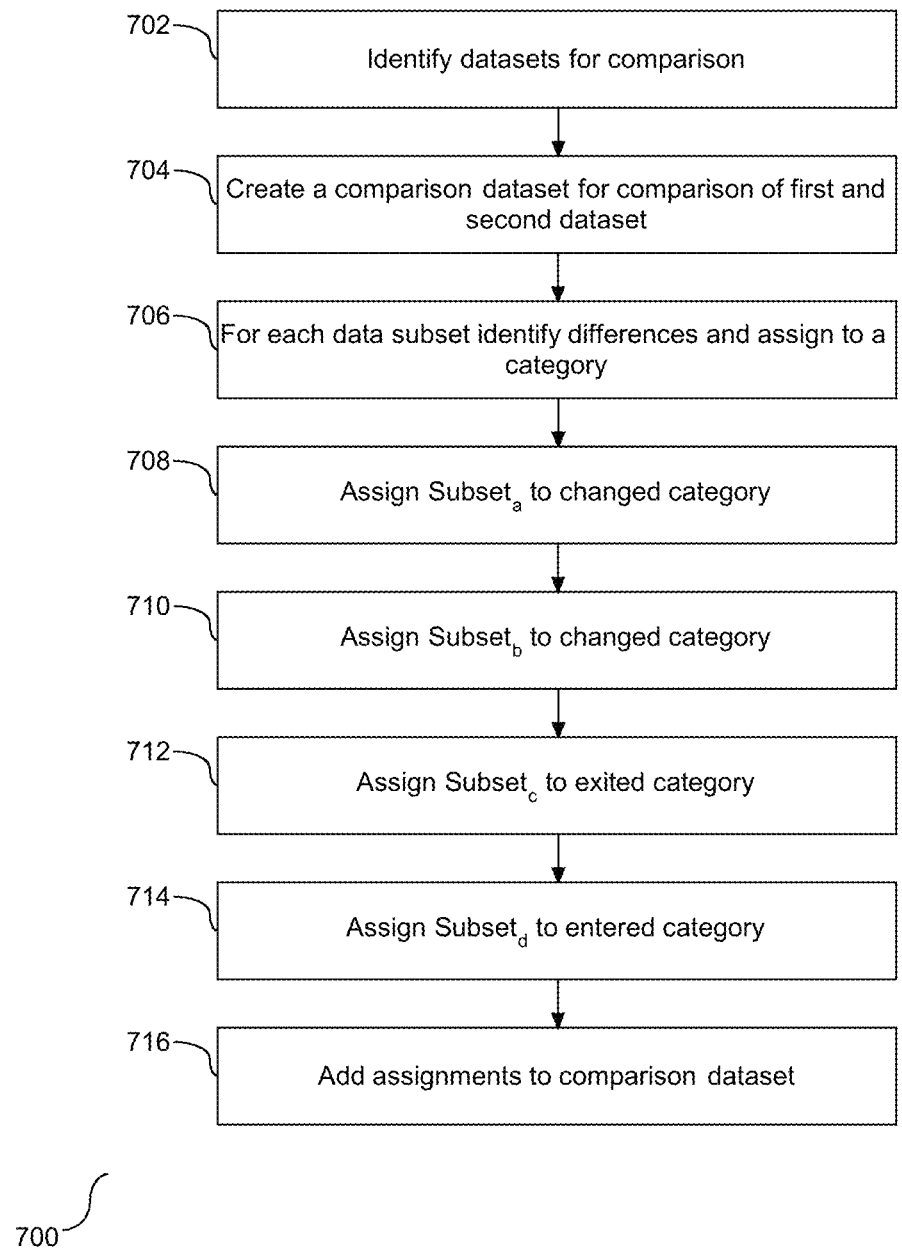
FIG. 7 depicts a flow chart illustrating a process of comparing subsets of data.

When comparing data versions, the comparison may be directed to data associated with a particular view, V. For example, the comparison may be a subset of a first dataset, $D_{s1}$ present in a first view, $V_1$ and saved in an exploration as a panel, $P_2$. A second subset of a second dataset, $D_{s2}$, present in a second view, $V_2$ and saved in an exploration as panel, $P_2$. Referring to FIG. 7, a flow chart (700) is provided illustrating a process of comparing subsets of data. The goal of the comparison is to visually convey an understanding of any differences. Four categories associated with the comparison may be assigned, including: entered, changed, same, and exited. The datasets, the first dataset, $D_{s1}$, and the second dataset, $D_{s2}$, are identified for comparison (702). In the example described herein, the first dataset, $D_{s1}$, has subsets of data, A, B, and C, and the second dataset, $D_{s1}$, has three subsets of data, A, B, and D. The first subset of data relates to the first dataset, $D_{s1}$, taken at a first point-in-time, and the second subset of data relates to the second dataset, $D_{s2}$, taken at a second point-in-time. A comparison of the first and second datasets creates a comparison dataset (704). For each dataset subset, the differences are identified and assigned to a category (706). Based on the example described, subset$_A$ is assigned to changed (708), subset$_B$ is assigned to changed (710), subset$_C$ is assigned to exited (712) and subset$_D$) is assigned to entered (714). The categorical assignments are then added to the comparison dataset (716). The quantity of data subsets and comparison categories shown here are examples, and as such should not be considered limiting the scope of the embodiment.

Figure 8:
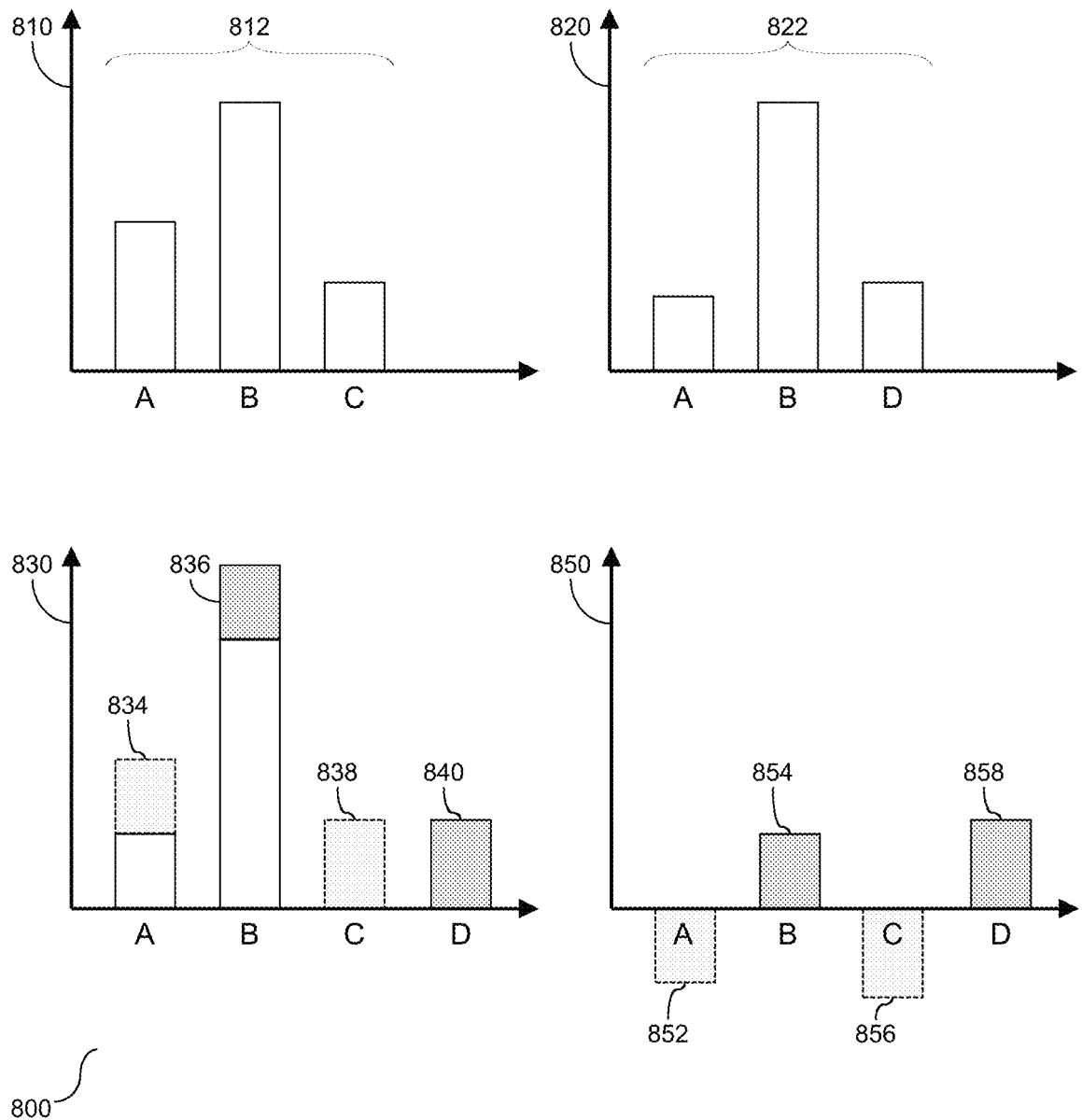
FIG. 8 depicts a graphical representation of a first dataset at a first point-in-time shown in the view.

Referring to FIG. 8, a diagram (800) is provided illustrating a combined superset. As shown, in a first view, $V_1$, a section of the view, includes a panel, $P_1$ (810) which illustrates a graphical representation of a first dataset, $D_1$ (812), at a first point-in-time. A second section of the view $V_1$ includes a second panel, $P_2$ (820), which illustrates a graphical representation of a second dataset, $D_2$ (822), at a second point-in-time. Comparison of the first and second datasets, $D_1$ (812) and $D_2$ (822), respectively, may be demonstrated in different forms. For example, an absolute baseline may be employed to exhibit a quantity of change with respect to the datasets with a magnitude of data differences superimposed. A third section of the view, $V_1$, includes a third panel, $P_3$ (830), which illustrates a graphical representation of a comparison of the first dataset, $D_1$ (812), at a first point-in-time with the second dataset, $D_2$ (822), at a second point-in-time. The baseline pertains to the first dataset, $D_1$ (812), at a first point-in-time. Differences in growth, e.g. increase in data values based on the baseline, are represented at (836) and (840) by a solid filled part of the bar, and decreases in data values based on the baseline are represented at (834) and (838) as a solid filled part of the bar and a dashed border. A fourth section of the view, $V_1$, includes a fourth panel, $P_4$ (850) which illustrates a graphical representation of a comparison of the first dataset $D_1$ (812) at a first point-in-time with the second dataset, $D_2$ (822), at a second point-in-time with the comparison limited to the data changes (e.g. no baseline). The data that is visible is limited to only the data that has changed between the data subsets. Increased values and associated magnitude of the increase are shown at (854) and (858), and decreased values and associated magnitude of the decrease shown at (852) and (856). In another embodiment the data can be shown in a separate comparison window. In another embodiment, the data can be animated to indicate the change within the chart.

In one embodiment, all of the panels with the view can be updated to show the comparison or a subset of the panels. The quantity of data subsets and comparison categories shown here are examples, and as such should not be considered limiting the scope of the embodiment. Accordingly, visual comparison of datasets can be used as shown herein.

In one embodiment, a first dataset $D_1$ may be missing a portion of data that is contained in a second dataset $D_2$. When comparing the datasets in a panel, the resulting comparison may be erroneous or invalid. The system can recognize when an attribute value is present in a first dataset, panel or exploration that is absent in the second dataset, panel or exploration. This type of comparison will be detected and can be visually indicated as an empty dataset. Examples of such visual indications include, but are not limited to border patterns or fill, object pattern or fill, and iconography. In a further embodiment, empty filtering and empty pivot choices are detected.

In one embodiment, a user interface widget for switching between different view and data states is provided. The states may be based on time, a point saved by the user, relationship, hierarchy, changes (in the dataset or view) or other variable. In one embodiment, the states are displayed in a list. The user is able to select any state in the list and view that state in the exploration window or panel. In another embodiment, the states are displayed in an interactive slider. Moving the slider will change the state displayed in the exploration window or panel. In another embodiment, the states are shown as objects in a version tree or hierarchy. The user is able to select any object in the tree or hierarchy. When selecting the object it will display the state associated with the object to the user. In another embodiment, the state may be presented to the user as a pop-up or pop-down when the state they are viewing has a more recent state available. In one embodiment, the history of the dataset is used to define different states that can be explored. In another embodiment, the history of user exploration is used to define different states that can be explored.

Figure 9:
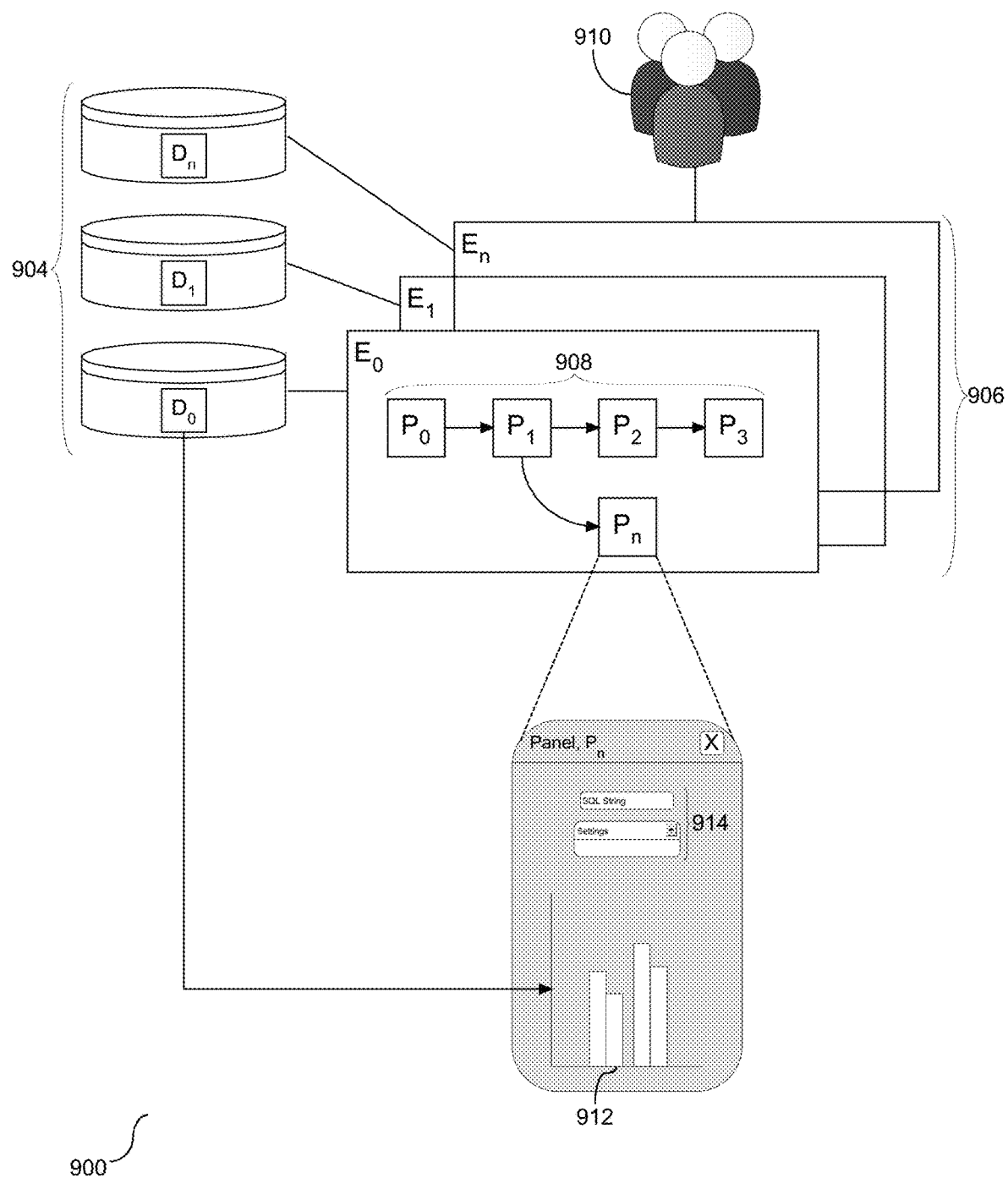
FIG. 9 depicts a flow diagram illustrating an exploration history stored in a relational database.

Referring to FIG. 9, a flow diagram (900) is provided illustrating an exploration history stored in a relational database (900). Each panel, $P=\{P_1, P_2, \ldots P_n\}$, (908) is associated with a data version $D=\{D_1, D_2, \ldots D_n\}$ (904), that was used to create the panel. Each panel is part of an exploration, $E=\{E_1, E_2, \ldots E_n\}$ (906), which represents the changes over time to the data exploration caused by user interactions. Each view, $V=\{V_1, V_2, \ldots V_n\}$, consists of one or more panels (908), each containing a data visualization (912) and user interface components (914) showing the associated data version of the associated view. A panel may be connected to one or more parent panel(s) which represents the directed acyclic graph (DAG) of the exploration. In one embodiment, at least one user (910) may be associated with one or more explorations that they have viewed or edited. In another embodiment, the positions of the panels may be changed manually. In a further embodiment, the positions of the panels are channels through automatic layout algorithms. The visualization of the exploration history allows for comprehension of changes between data versions.

Figure 10:
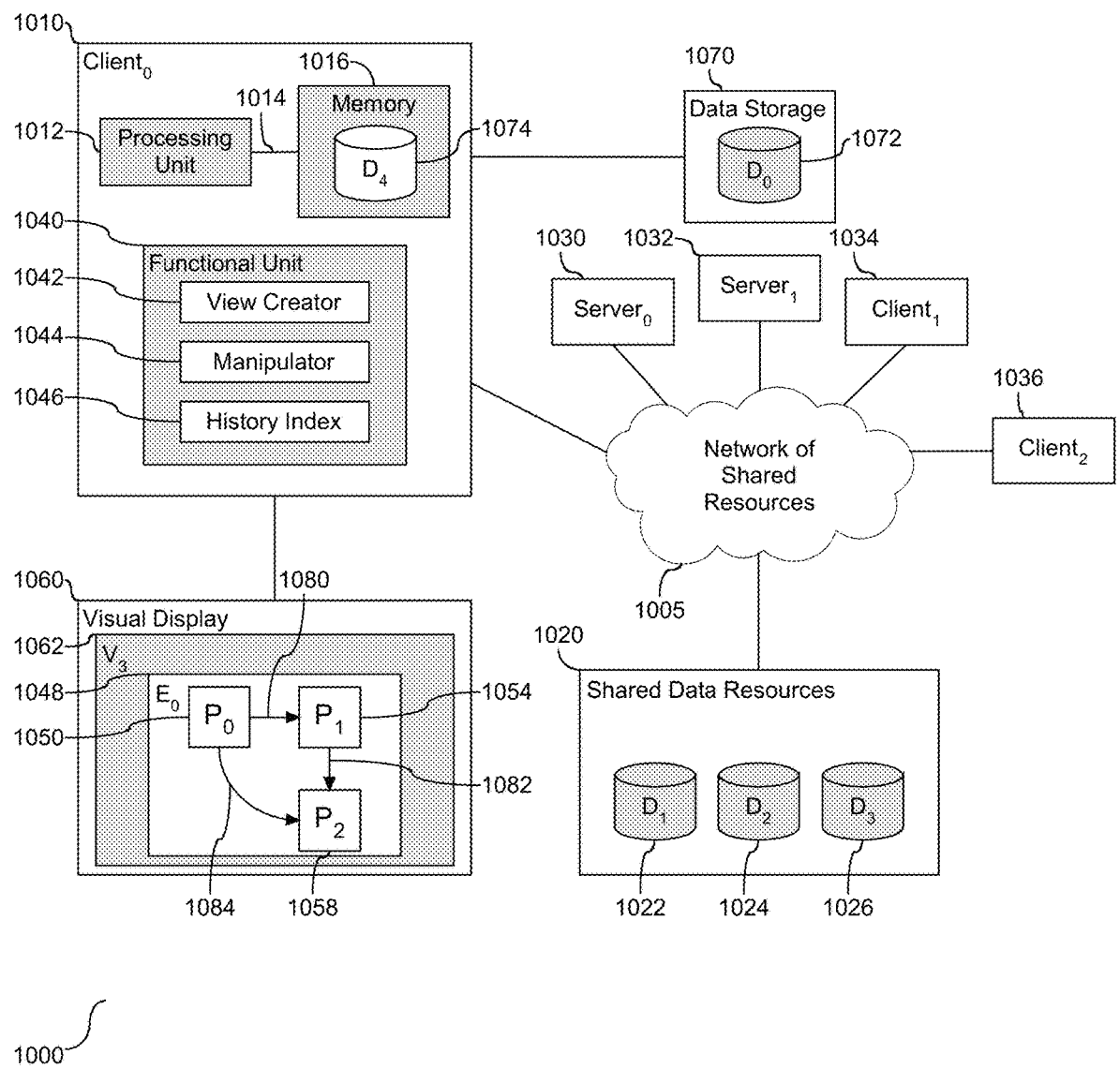
FIG. 10 depicts a schematic example of a system to implement the process shown and described in FIGS. 1-9.

Aspects of the exploration history shown and described in FIGS. 1-9, employ one or more tools to support creating and displaying differences between data versions, analyzing structural changes between data versions, and storage and preservation of the explorations. Referring to FIG. 10, a block diagram (1000) is provided illustrating a computer system that supports and enables the creation, analysis, and storage of data explorations. A client machine, client$_0$ (1010)

is shown in communication with data storage (1070) and a visual display (1060). The client machine, $client_0$ (1010) is also connected to a network of shared resources (1005) to provide the $client_0$ (1010) with access to shared resources, including, but not limited to, shared data resources (1020), other client machines, $client_1$ (1034) and $client_2$ (1036), and servers, $server_0$ (1030) and $server_1$ (1032). In this example, shared data resources (1020) contain databases, $D_1$ (1022), $D_2$ (1024) and $D_3$ (1026), and separate data storage (1070) contains a database, $D_0$ (1072). As shown, the client machine, $client_0$, (1010) is configured with a processing unit (1012) in communication with a memory (1016) across a bus (1014). Optionally, the memory (1016) has an embedded database, $D_4$ (1074). A functional unit (1040) is embedded into the client machine, $client_0$ (1010) and is in communication with the processing unit (1012). The functional unit (1040) contains the tools to support data exploration and visualization, including but not limited to, a view creator (1042) a manipulator (1044), and a history index (1046).

Example

Database $D_0$ (1070) is requested to be viewed at a time, $t_0$, on the visual display device (1060). View creator (1042) creates a first view, $V_0$, and displays $V_0$ on the visual display device (1060). Concurrently, the history index (1046) tracks the creation of $V_0$ by creating a first exploration, $E_0$ (1048), that tracks the history of the associated data exploration. Panel, $P_0$ (1050), captures $V_0$ within $E_0$ (1048) and saves it into memory (1016). At time, $t_1$, $D_0$ (1070) is requested to be viewed on the visual display device (1060). The view creator (1042) creates a second view, $V_1$, and displays $V_1$ on the visual display device (1060). Concurrently, the history index (1046) creates a second panel, $P_1$ (1054), which captures $V_1$ within $E_0$ (1048) and saves it into memory (1016). The history index (1046) creates a link (1080) between $P_0$ (1050) and $P_1$ (1054) in the exploration, $E_0$ (1048) and saves it into memory (1016). At such time as a comparison of $V_0$ and $V_1$ is requested, manipulator (1044) analyzes the data and consults the history index (1046) to determine the location of the data contained in $V_0$ and $V_1$ and the corresponding panels, $P_0$ (1050) and $P_1$ (1054). The manipulator (1044) creates a combined superset of panels $P_0$ (1050) and $P_1$ (1054) and encodes the data within the superset. The view creator creates a third view, $V_2$, which encompasses the combined superset created by the manipulator (1044) and displays $V_2$ on the visual display device (1060). The history index (1046) creates a third panel, $P_2$ (1058), which captures $V_2$ within $E_0$ (1048) and saves it into memory (1016). The history index (1046) also links $P_2$ to $P_1$ (1082) and links $P_2$ to $P_0$ (1084) and saves it into memory (1016). The entire exploration history can be viewed on the visual display device (1060). When requested to display the exploration history, the view creator (1042) consults the history index (1046) for the location of the exploration history and creates a fourth view, $V_3$ (1062) which encompasses $E_0$ (1048) and displays $V_3$ (1062) on the visual display device (1060). In one embodiment, the history index (1046) stores panels. The amount and type of components shown in this example should not be considered to limit the scope of the invention. Accordingly, the computer system can employ one or more tools to support creating and displaying differences between data versions, analyzing structural changes between data versions, and storage and preservation of the explorations.

The shared data resource, such as resource (1020) may be in the form of a storage array. The array is commonly configured with a storage controller to manage two or more storage devices The storage array can be one dimensional with a single category of storage devices, or in one embodiment multi-dimensional, also referred to herein as a tiered storage solution with multiple types of storage, e.g. persistent RAM, SSD, HDD, and Tape. More specifically, tiered storage directs data to a storage media within the storage array based on performance, availability, and recovery requirements.

Aspects of the function unit, e.g. tools, and their associated functionality may be embodied in a computer system/server in a single location, or in one embodiment, may be configured in a cloud based system sharing computing resources. With references to FIG. 11, a block diagram (1100) is provided illustrating an example of a computer system/server (1102), hereinafter referred to as a host (1102) in communication with a cloud based support system, to implement the processes described above with respect to FIGS. 1-9. Host (1102) is operational with numerous other general purpose or special purpose computing system environments or configurations. Examples of well-known computing systems, environments, and/or configurations that may be suitable for use with host (1102) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (1102) may be described in the general context of computer system-executable instructions, such as program modules, being executed by a computer system. Generally, program modules may include routines, programs, objects, components, logic, data structures, and so on that perform particular tasks or implement particular abstract data types. Host (1102) may be practiced in distributed cloud computing environments where tasks are performed by remote processing devices that are linked through a communications network. In a distributed cloud computing environment, program modules may be located in both local and remote computer system storage media including memory storage devices.

Figure 11:
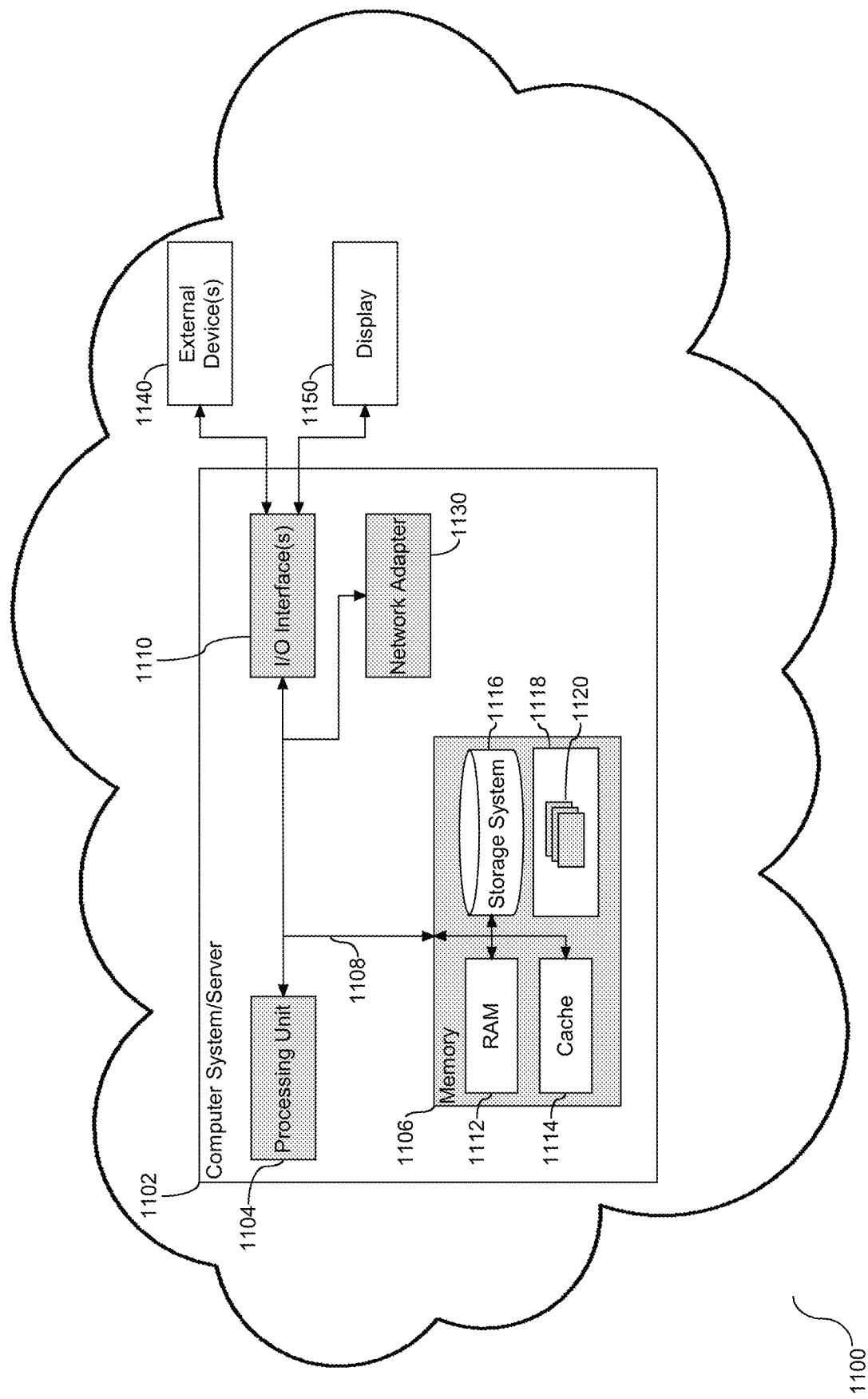
FIG. 11 is a block diagram illustrating an example of a computer system/server of a cloud based support system, to implement the processes described above with respect to FIGS. 1-9.

As shown in FIG. 11, host (1102) is shown in the form of a general-purpose computing device. The components of host (1102) may include, but are not limited to, one or more processors or processing units (1104), a system memory (1106), and a bus (1108) that couples various system components including system memory (1106) to processor (1104). Bus (1108) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (1102) typically includes a variety of computer system readable media. Such media may be any available media that is accessible by host (1102) and it includes both volatile and non-volatile media, removable and non-removable media.

Memory (1106) can include computer system readable media in the form of volatile memory, such as random access memory (RAM) (1112) and/or cache memory (1114).

By way of example only, storage system (1116) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (1108) by one or more data media interfaces.

Program/utility (1118), having a set (at least one) of program modules (1120), may be stored in memory (1106) by way of example, and not limitation, as well as an operating system, one or more application programs, other program modules, and program data. Each of the operating systems, one or more application programs, other program modules, and program data or some combination thereof, may include an implementation of a networking environment. Program modules (1120) generally carry out the functions and/or methodologies of embodiments of supporting data exploration, tracking data exploration, visually encoding data, and analyzing an associated dataset. For example, the set of program modules (1120) may include the modules configured to implement the online and offline support of data exploration, tracking of data exploration, visually encoding data and analyzing an associated dataset as described in FIGS. 1-10.

Host (1102) may also communicate with one or more external devices (1140), such as a keyboard, a pointing device, etc.; a display (1150); one or more devices that enable a user to interact with host (1102); and/or any devices (e.g., network card, modem, etc.) that enable host (1102) to communicate with one or more other computing devices. Such communication can occur via Input/Output (I/O) interface(s) (1110). Still yet, host (1102) can communicate with one or more networks such as a local area network (LAN), a general wide area network (WAN), and/or a public network (e.g., the Internet) via network adapter (1130). As depicted, network adapter (1130) communicates with the other components of host (1102) via bus (1108). In one embodiment, a plurality of nodes of a distributed file system (not shown) is in communication with the host (1102) via the I/O interface (1110) or via the network adapter (1130). It should be understood that although not shown, other hardware and/or software components could be used in conjunction with host (1102). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (1106), including RAM (1112), cache (1114), and storage system (1116), such as a removable storage drive and a hard disk installed in a hard disk drive.

Computer programs (also called computer control logic) are stored in memory (1106). Computer programs may also be received via a communication interface, such as network adapter (1130). Such computer programs, when run, enable the computer system to perform the features of the present embodiments as discussed herein. In particular, the computer programs, when run, enable the processing unit (1104) to perform the features of the computer system. Accordingly, such computer programs represent controllers of the computer system.

The present embodiments may be a system, a method, and/or a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

In one embodiment, host (1102) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 12:
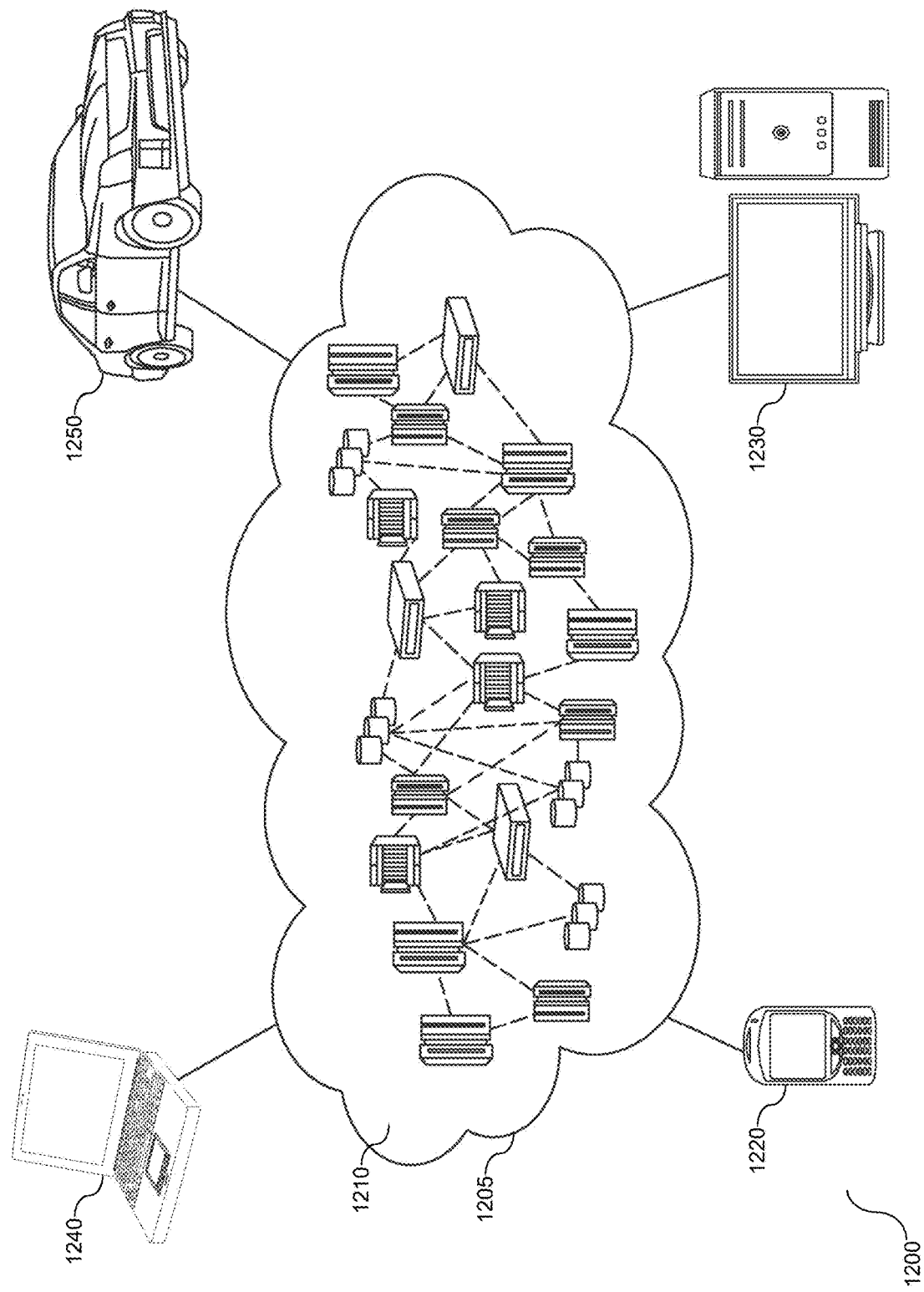
FIG. 12 depicts a block diagram illustrating a cloud computing environment.

Referring now to FIG. 12, an illustrative cloud computing network (1200). As shown, cloud computing network (1200) includes a cloud computing environment (1205) having one or more cloud computing nodes (1210) with which local computing devices used by cloud consumers may communicate. Examples of these local computing devices include, but are not limited to, personal digital assistant (PDA) or cellular telephone (1220), desktop computer (1230), laptop computer (1240), and/or automobile computer system (1250). Individual nodes within nodes (1210) may further communicate with one another. They may be grouped (not shown) physically or virtually, in one or more networks, such as Private, Community, Public, or Hybrid clouds as described hereinabove, or a combination thereof. This allows cloud computing environment (1200) to offer infrastructure, platforms and/or software as services for which a cloud consumer does not need to maintain resources on a local computing device. It is understood that the types of computing devices (1220)-(1250) shown in FIG. 12 are intended to be illustrative only and that the cloud computing environment (1205) can communicate with any type of computerized device over any type of network and/or network addressable connection (e.g., using a web browser).

Figure 13:
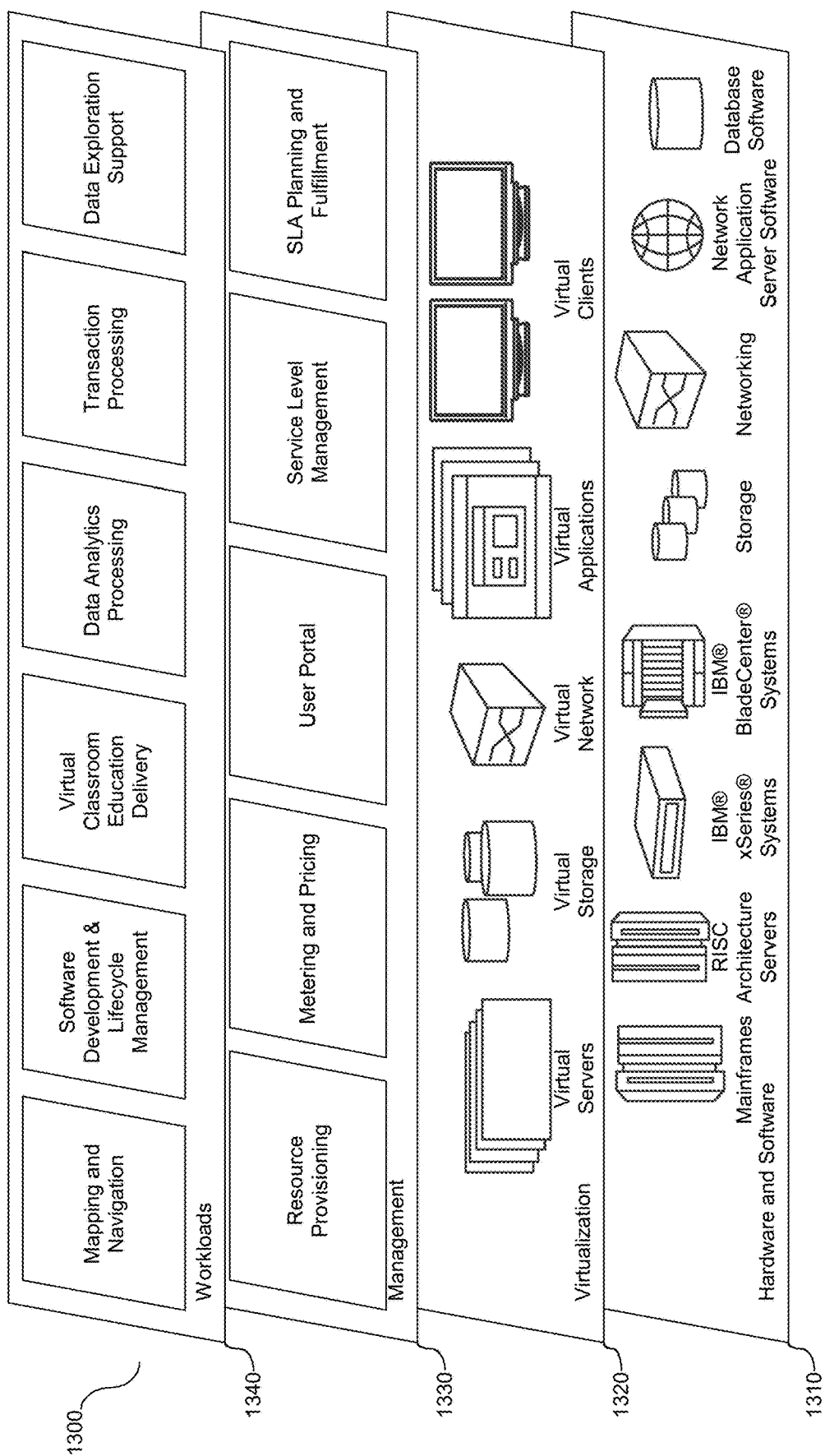
FIG. 13 depicts a block diagram illustrating a set of functional abstraction model layers provided by the cloud computing environment.

Referring now to FIG. 13, a set of functional abstraction layers provided by the cloud computing network of FIG. 11 is shown. It should be understood in advance that the components, layers, and functions shown in FIG. 13 are intended to be illustrative only, and the embodiments are not limited thereto. As depicted, the following layers and corresponding functions are provided: hardware and software layer (1310), virtualization layer (1320), management layer (1330), and workload layer (1340). The hardware and software layer (1310) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (1320) provides an abstraction layer from which the following examples of virtual entities may be provided: virtual servers; virtual storage; virtual networks, including virtual private networks; virtual applications and operating systems; and virtual clients.

In one example, management layer (1330) may provide the following functions: resource provisioning, metering and pricing, user portal, service level management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer (1340) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and supporting data exploration, tracking of data exploration, visually encoding data, and analyzing an associated dataset.

As will be appreciated by one skilled in the art, the aspects may be embodied as a system, method, or computer program product. Accordingly, the aspects may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the aspects described herein may take the form of a computer program product embodied in one or more computer readable medium(s) having computer readable program code embodied thereon.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

The embodiments are described above with reference to flow chart illustrations and/or block diagrams of methods, apparatus (systems), and computer program products. It will be understood that each block of the flow chart illustrations and/or block diagrams, and combinations of blocks in the flow chart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow chart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions, which execute on the computer or other programmable apparatus, provide processes for implementing the functions/acts specified in the flow chart and/or block diagram block or blocks.

The flow charts and block diagrams in the Figures illustrate the architecture, functionality, and operation of possible implementations of systems, methods, and computer program products according to various embodiments. In this regard, each block in the flow charts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow chart illustration(s), and combinations of blocks in the block diagrams and/or flow chart illustration(s), can be implemented by special purpose hardware-based systems that perform the specified functions or acts, or combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The embodiments described herein may be implemented in a system, a method, and/or a computer program product. The computer program product may include a computer readable storage medium (or media) having computer readable program instructions thereon for causing a processor to carry out the embodiments described herein.

The embodiments are described herein with reference to flow chart illustrations and/or block diagrams of methods, apparatus (systems), and computer program products. It will be understood that each block of the flow chart illustrations and/or block diagrams, and combinations of blocks in the flow chart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flow chart and/or block diagram block or blocks.

It will be appreciated that, although specific embodiments have been described herein for purposes of illustration, various modifications may be made without departing from the spirit and scope of the specific embodiments described herein. Accordingly, the scope of protection is limited only by the following claims and their equivalents.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the embodiments in the form disclosed.

Indeed, executable code could be a single instruction, or many instructions, and may even be distributed over several different code segments, among different applications, and across several memory devices. Similarly, operational data may be identified and illustrated herein within the tool, and may be embodied in any suitable form and organized within any suitable type of data structure. The operational data may be collected as a single dataset, or may be distributed over different locations including over different storage devices, and may exist, at least partially, as electronic signals on a system or network.

Furthermore, the described features, structures, or characteristics may be combined in any suitable manner in one or more embodiments. In the following description, numerous specific details are provided, such as examples of agents, to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Accordingly, the implementation of visually encoding data according to differences in data states provides an easy to understand visualization of the exploration history of datasets of any size.

It will be appreciated that, although specific embodiments of the invention have been described herein for purposes of illustration, various modifications may be made without departing from the spirit and scope of the invention. In particular, the type of indicator applied to a panel should not be limited. Similarly, the type of data tracked should not be limited. Examples of tracked data include, but are not limited to, stocks prices, financial key performance indicators, server cluster sensor readings and transportation infrastructure monitoring data. Accordingly, the scope of protection of this invention is limited only by the following claims and their equivalents.

What is claimed is:

1. A computer system comprising:
a processing unit in communication with memory;
a functional unit in communication with the processing unit having tools to present data based on a viewing and change history, the tools comprising;

a history index to create a first exploration having a plurality of panels, the exploration including a first panel and a second panel, the first panel to represent a first view of a first data version and the second panel to represent a second view of the first data version;

the history index to create a second exploration having a plurality of panels, the second exploration including a third panel and a fourth panel, the third panel to represent a third view of a second data version and the fourth panel to represent a fourth view of the second data version a manipulator to create a first combined view comprising the first panel and the second panel, the first combined view containing a first data visualization of the first data version;

the manipulator to create a second combined view comprising the third and fourth panel containing second data visualization of the second data version;

the manipulator to compare the first and second combined views and display structural changes between the first and second data versions responsive to the comparison.

2. The system of claim 1, further comprising creating a link connecting panels in each exploration, the link forming a trail of the connected panels, the trail representing a path and association of actions as related to the data versions underlying the connected panels.

3. The system of claim 2, wherein the formed trail includes a hierarchical arrangement of the linked panels, the arrangement includes a parent panel and one or more child panels, and the arrangement representing a directed acyclic graph of the exploration.

4. The system of claim 1, further comprising applying indicia to one or more of the panels, the indicia visually identifying one or more structural changes to a corresponding exploration, the structural changes selected from the group consisting of: entry of one or more panels to the corresponding exploration, and exit of one or more panels from the corresponding exploration.

5. The system of claim 1, wherein the first data visualization of the first data version and the second data visualization of the second data version are dynamic and change in real-time subject to changes in data, and further comprising tracking changes to the data visualizations with structural changes to the corresponding exploration.

6. A computer program product for presenting data based on a viewing and change history, the computer program product comprising a computer readable storage device having program code embodied therewith, the program code executable by a processor to:

create a first exploration having a plurality of panels, the exploration including a first panel and a second panel, the first panel to represent a first view of a first data version and the second panel to represent a second view of the first data version;

create a second exploration having a plurality of panels, the second exploration including a third panel and a fourth panel, the third panel to represent a third view of a second data version and the fourth panel to represent a fourth view of the second data version create a first combined view comprising the first panel and the second panel, the first combined view containing a first data visualization of the first data version;

create a second combined view comprising the third and fourth panel containing second data visualization of the second data version;

compare the first and second combined views and display structural changes between the first and second data versions responsive to the comparison.

7. The computer program product of claim 6, further comprising creating a link connecting panels in each exploration, the link forming a trail of the connected panels, the trail representing a path and association of actions as related to the data versions underlying the connected panels.

8. The computer program product of claim 7, wherein the formed trail includes a hierarchical arrangement of the linked panels, the arrangement includes a parent panel and one or more child panels, and the arrangement representing a directed acyclic graph of the exploration.

9. The computer program product of claim 6, further comprising applying indicia to one or more of the panels, the indicia visually identifying one or more structural changes to a corresponding exploration, the structural changes selected from the group consisting of: entry of one or more panels to the corresponding exploration, and exit of one or more panels from the corresponding exploration.

10. The computer program product of claim 6, wherein the first data visualization of the first data version and the second data visualization of the second data version are dynamic and change in real-time subject to changes in data, and further comprising tracking changes to the data visualizations with structural changes to the corresponding exploration.

11. A method comprising:

creating a first exploration having a plurality of panels, the exploration including a first panel and a second panel, the first panel to represent a first view of a first data version and the second panel to represent a second view of the first data version;

creating a second exploration having a plurality of panels, the second exploration including a third panel and a fourth panel, the third panel to represent a third view of a second data version and the fourth panel to represent a fourth view of the second data version creating a first combined view comprising the first panel and the second panel, the first combined view containing a first data visualization of the first data version;

creating a second combined view comprising the third and fourth panel containing second data visualization of the second data version;

comparing the first and second combined views and displaying structural changes between the first and second data versions responsive to the comparison.

12. The method of claim 11, further comprising creating a link connecting panels in each exploration, the link forming a trail of the connected panels, the trail representing a path and association of actions as related to the data versions underlying the connected panels.

13. The method of claim 12, wherein the formed trail includes a hierarchical arrangement of the linked panels, the arrangement includes a parent panel and one or more child panels, and the arrangement representing a directed acyclic graph of the exploration.

14. The method of claim 11, further comprising applying indicia to one or more of the panels, the indicia visually identifying one or more structural changes to a corresponding exploration, the structural changes selected from the group consisting of: entry of one or more panels to the corresponding exploration, and exit of one or more panels from the corresponding exploration.

15. The method of claim 11, wherein the first data visualization of the first data version and the second data visualization of the second data version are dynamic and change in real-time subject to changes in data, and further comprising tracking changes to the data visualizations with structural changes to the corresponding exploration.

* * * * *